_US006164433A_

United States Patent [19]
Buurma

[11] Patent Number: 6,164,433
[45] Date of Patent: Dec. 26, 2000

[54] DEVICE FOR FEEDING PIECES OF DOUGH TO DOUGH TRAYS OF A PRE-PROOFING CABINET

[75] Inventor: Arend Leendert Buurma, Uden, Netherlands

[73] Assignee: NAAK, Johan Hendrik Bernard, Netherlands

[21] Appl. No.: 09/341,201

[22] PCT Filed: Jan. 6, 1998

[86] PCT No.: PCT/NL98/00004

§ 371 Date: Oct. 21, 1999

§ 102(e) Date: Oct. 21, 1999

[87] PCT Pub. No.: WO98/30103

PCT Pub. Date: Jul. 16, 1998

[30] Foreign Application Priority Data

Jan. 6, 1997 [NL] Netherlands ............................ 1004935

[51] Int. Cl.[7] .................................................. B65G 25/00
[52] U.S. Cl. ...................................... 198/464.4; 198/468.4
[58] Field of Search .............................. 198/464.1, 468.4, 198/751, 468.2; 414/752, 750

[56] References Cited

U.S. PATENT DOCUMENTS 5,688,103  11/1997  Tsuji et al. .......................... 198/464.4

FOREIGN PATENT DOCUMENTS

| 0063400 | 4/1982 | European Pat. Off. . |
| 0190906 | 3/1986 | European Pat. Off. . |
| 0346976 | 9/1989 | European Pat. Off. . |
| 1205023 | 3/1964 | Germany . |
| 1207304 | 9/1964 | Germany . |
| 1956697 | 11/1969 | Germany . |

*Primary Examiner*—Kenneth W. Noland
*Attorney, Agent, or Firm*—Howard & Howard

[57] ABSTRACT

Device for feeding pieces of dough to dough trays of a pre-proofing cabinet, provided with a first and a second conveyor belt (5, 6) for continuously conveying pieces (7) of dough in a conveying direction and PCT conveying velocity, which conveyor belts have a dough bearing surface (29) and a driving surface (30), an incoming end an outgoing end at least four driving rolls (15, 16, 17, 18). The device further contains a trolley (24) moving reciprocally in conveying direction from a starting position to a farthest position, on which trolley two driving rolls of the first and the second conveyor belt are mounted. In response to a control signal, the conveying velocity of the second conveyor belt is increased with an additional velocity and subsequently decelerated to the conveying velocity and each time one reciprocating motion of the trolley is started.

5 Claims, 1 Drawing Sheet

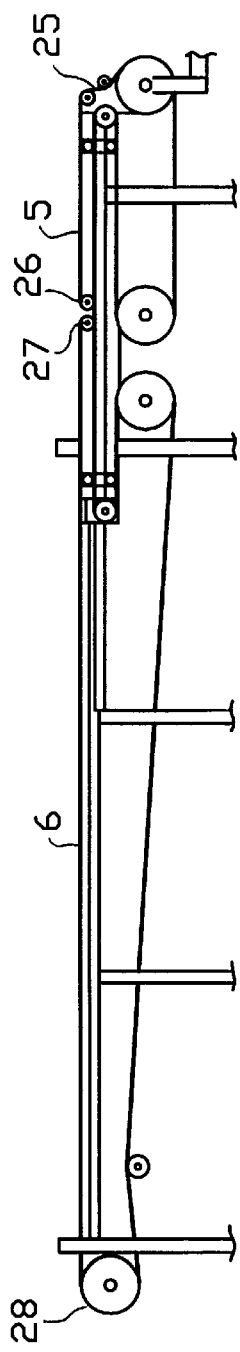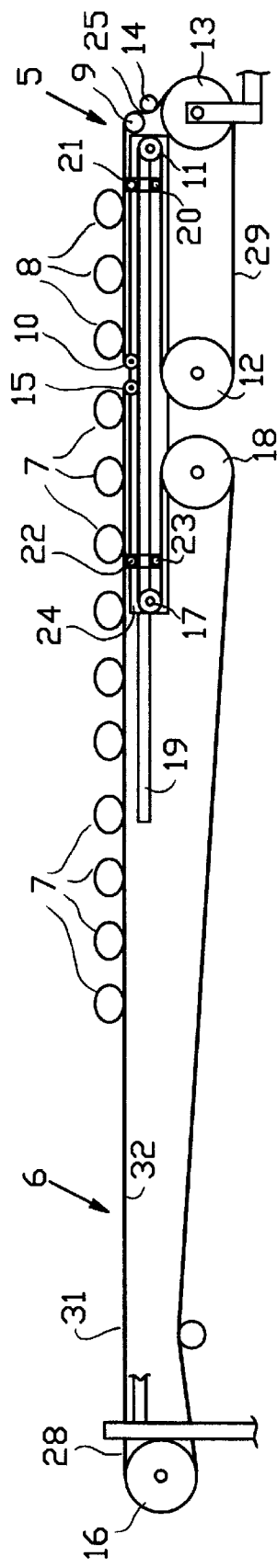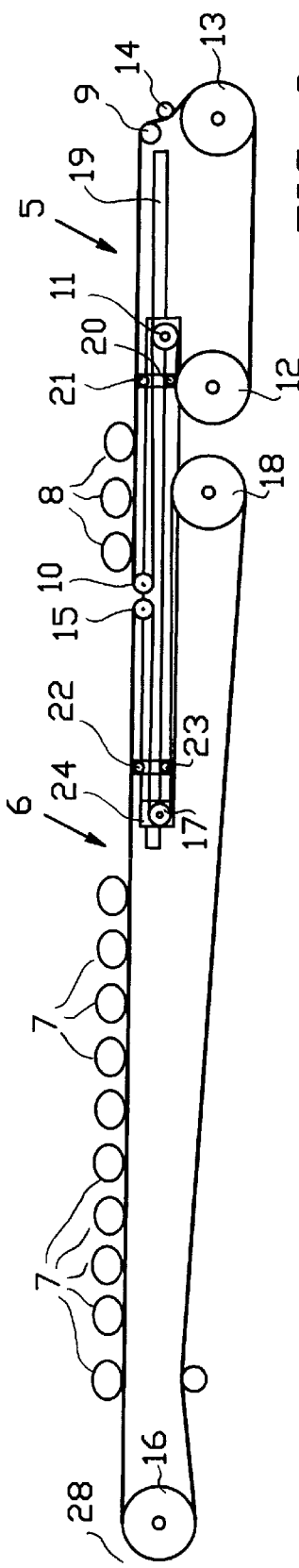

DEVICE FOR FEEDING PIECES OF DOUGH TO DOUGH TRAYS OF A PRE-PROOFING CABINET

The present invention relates to a device for feeding pieces of dough, which have for instance been made on a cambering machine, to dough trays of a pre-proofing cabinet.

A suchlike device that is used to practice comprises a first conveyor which conveys the pieces of dough from the cambering machine to a second conveyor. The second conveyor can be driven intermittently or can have a sinusoid conveying velocity. Pieces of dough on the second conveyor are pushed off this by a pusher mechanism in a direction transverse to the conveying direction of the second conveyor into dough trays which are placed along the second conveyor. The pieces of dough are pushed off the second conveyor when the conveying velocity of the second conveyor is at its lowest. With the help of a suchlike device approximately 6000 pieces of dough per hour can be placed in dough trays, without extensive and expensive additions.

An object of the present invention is to provide a device for feeding pieces of dough to dough trays of a pre-proofing cabinet, with the help of which 8000 pieces of dough can in a simple manner be fed to dough trays per hour, the device remaining compact and cheap.

For this purpose the invention provides a device for feeding pieces of dough to dough trays of a pre-proofing cabinet, which device is provided with a first conveyor belt for continuously conveying pieces of dough in a conveying direction and at a conveying velocity, which first conveying belt has a dough bearing surface, and an opposing driving surface, an incoming end and an outgoing end, which first conveyor belt contains at least four driving rolls, in which a first of the driving rolls defines the incoming end and a second of the driving rolls defines the outgoing end, the first and the second driving roll contacting the driving surface of the first conveyor belt and lying in one plane, in which a third of the driving rolls lies under the plane and between the first and second driving rolls and contacts the dough bearing surface of the first conveyor belt, in which a fourth of the driving rolls lies beneath the third driving roll and contacts the driving surface of the first conveyor belt, the third driving roll being located between the first and the fourth driving roll, a first driving means for driving at least one of the driving rolls of the first conveyor belt, a second conveyor belt for continuously conveying pieces of dough in a conveying direction and at a conveying velocity, which second conveyor belt is placed on the extension of the first conveyor belt, which second conveyor belt has a dough bearing surface and an opposing driving surface, an incoming end and an outgoing end, which second conveying belt contains at least four driving rolls, in which a first of the driving rolls defines the incoming end and a second of the driving rolls defines the outgoing end, the first and the second driving roll contacting the driving surface of the second conveyor belt and are in one plane, in which a third of the driving rolls lies under the plane and between the first and second driving rolls and contacts the dough bearing surface of the second conveyor belt, in which a fourth of the driving rolls lies beneath the third driving roll and contacts the driving surface of the second conveyor belt, the third driving roll being located between the second and the fourth driving roll, in which the incoming end of the second conveying belt connects to the outgoing end of the first conveyor belt, a second driving means for driving at least one of the driving rolls of the second conveyor belt independant of the drive of the first conveyor belt, a trolley moving reciprocally in conveying direction from a starting position to a farthest position, on which trolley the second and the third driving roll of the first conveyor belt and the first and third driving roll of the second conveyor belt are mounted, a third driving means for driving the trolley independant of the drive of the conveyor belts, the second driving means being a driving means for increasing the conveyor velocity of the second conveyor belt by an additional velocity in response to a control signal, subsequently decelerating it to a standstill or almost to a standstill and then accelerating to the conveying velocity, and the third driving means being a driving means for starting one reciprocating motion of the trolley in response to the control signal. With the help of this device the conveying velocity of the second conveyor belt can be increased in response to a control signal, whereby the distance between the piece of dough closest to the incoming end of the second conveyor belt and that closest to the outgoing end of the first conveyor belt is enlarged, which is conducive to the reproductive pushing-off of pieces of dough from the second conveyor belt. In addition, the trolley can be moved from its initial position to its farthest position, so that it is ensured that no pieces of dough are placed from the first onto the second conveyor belt, while the first conveyor belt can still be driven continuously. After deceleration, when the second conveyor belt comes to a stillstand or almost to a stillstand, the determined number of pieces of dough is pushed off the second conveyor belt and the trolley can be moved to its initial position again, the second conveyor belt is meanwhile driven again at the same conveying velocity, as a result of which there is an accelerated transfer of pieces of dough from the first to the second conveyor belt. When the trolley has reached its initial position again, the following cycle is started in response to the following control signal. Because the conveyor belts are driven continuously and because the trolley provides sufficient separation between the pieces of dough and sufficient time for a correct pushing-off of pieces of dough on the one hand, and realizes an accelerated transport of pieces of dough from the first to the second conveyor belt on the other hand, the capacity of the device is considerably upgraded and it is possible to process 8000 pieces of dough or even more per hour. The device according to the invention moreover ensures that there is no contact between the pieces of dough, which is advantageous for the action of the device and the subsequent dough processes. In addition, the inventive device prevents more than one piece of dough from ending up in a dough tray holder, in other words the device is self-rectifiable and does not jam. The determined number of pieces of dough is moreover presented to the pushing mechanism in a properly eccentric fashion, so that pushing-off can take place correctly. Finally, the device is constructed such that hygienic operation is ensured.

The control signal can be generated by the pre-proofing cabinet, so that the action of the device can be synchronous with the action of the pre-proofing cabinet. The control signal can, alternatively, be generated by a detection means for detecting a determined number of pieces of dough on the second conveyor belt.

By way of example a few embodiments of an device according to the invention will be described on the basis of the drawing, in which, FIG. 1 schematically shows a part of a dough processing line with a device according to the invention;

FIG. 2 schematically shows a device according to the invention with the trolley in the initial position, and FIG. 3 schematically shows a device according to the invention with the trolley in the farthest position.

In FIG. 1 a part of a dough processing line is shown, in which in a cambering machine (not shown) pieces of dough are given a spherical shape. Pieces of dough from the cambering machine are transferred to a device according to the invention. The device according to the invention comprises a first conveyor belt 5 and a second conveyor belt 6 which is placed on the extension of the first conveyor belt 5. The first conveyor belt 5 has an incoming end 25 and an outgoing end 26. The second conveyor belt 6 has an incoming end 27 that connects to the outgoing end 26 of the first conveyor belt 5, and an outgoing end 28. The first and second conveyor belt 5, 6 convey pieces of dough continuously in a conveying direction at a conveying velocity.

In this exemplary embodiment pieces of dough that ultimately reach the second conveyor belt 6 are pushed off the second conveyor belt 6 by a pushing mechanism which is known per se and therefore not shown, in a direction transverse to the conveying direction of the second conveyor belt 6 and end up in holders of a dough tray that can, for instance, be placed in a pre-proofing cabinet.

Although the invention is described on the basis of an invention that conveys pieces of dough from a cambering machine to dough trays of a pre-proofing cabinet, it will be clear that the device can similarly be used for conveying pieces of dough between two other dough processing machines.

The device according to the invention is shown in more detail in FIGS. 2 and 3.

The first conveyor belt 5 has a dough bearing surface 29 for carrying the pieces of dough 8 and a drive surface 30 opposite the dough bearing surface 29. The first conveyor belt 5 further contains at least four driving rolls 9, 10, 11 and 12, the first driving roll 9 defining the incoming end 25 and the second driving roll 10 defining the outgoing end 26. The first and the second driving roll 9, 10 contact the drive surface 30 of the first conveyor belt 5 and lie in a plane, which extends almost horizontally, for example. The third driving roll 11 lies beneath this plane and between the first and second driving roll 9 and 10 and contacts the dough bearing surface 29 of the first conveyor belt 5. The fourth driving roll 12 lies under the third driving roll 11 and contacts the driving surface 29 of the first conveyor belt 5. The third driving roll 11 lies between the first driving roll 9 and the fourth driving roll 12.

The second conveyor belt 6 has a bearing surface 31 for carrying the pieces of dough 7 and a driving surface 32 opposite the dough bearing surface 31. In addition, the second conveyor belt 6 contains at least four driving rolls 15, 16, 17 and 18, in which the first driving roll 15 defines the incoming end 27 and the second driving roll 16 defines the outgoing end 28. The first and the second driving roll 15, 16 contact the driving surface 32 of the second conveyor belt 6 and lie in one plane, which is almost horizontal, for example. The third driving roll 17 lies beneath this plane and between the first and second driving roll 16 and contacts the dough bearing surface 31 of the second conveyor belt 6. The fourth driving roll 18 lies beneath the third driving roll 17 and contacts the driving surface 31 of the second conveyor belt 6. The third driving roll 17 lies between the second driving roll 16 and the fourth driving roll 18.

The device according to the invention further contains a trolley 24 that is reciprocally movable in a conveying direction from an initial position (shown in FIG. 2) to a farthest position (shown in FIG. 3). The second and third driving roll 10 and 11 of the first conveyor belt 5 and the first and third driving roll 15 and 17 of the second conveyor belt 6 are mounted on this trolley 24. In this example the reciprocal motion of the trolley 24 takes place owing to the fact that pairs of wheels 20, 21 and 22, 23, attached to the trolley, extend over a guide rod 19.

So as in all cabinets to be able to guarantee that when the trolley comes into the initial position no irregularities occur during the transfer of pieces of dough from the cambering machine onto the first conveyor belt 5, the first conveyor belt 5 is preferably provided with two additional driving rolls 13 and 14 placed one below the other and under the first driving roll 9. The driving roll 13 contacts the driving surface 30 of the first conveyor belt 5 and the driving roll 14 the dough bearing surface 29.

The action of the device of the invention can be controlled by a detection means for detecting the number of pieces of dough 7 that are on the conveyor belt 6. This detection means can, for instance, contain photo sensors and be fixedly placed near the transition between the first and the second conveyor belt 5 and 6 when the trolley is in its initial position. The photo sensors then detect the number of pieces of dough passing that fixed position. The photo sensors can alternatively be placed on the movable trolley 24 at a level with the transition from the first to the second conveyor belt 5, 6. In addition, the detection means contains a means for generating and issuing a control signal in response to the detection of a determined number of pieces of dough, in this case a number equal to the number of holders in a dough tray.

Preferably the device according to the invention is however controlled by a control signal generated by the pre-proofing cabinet, which control signal controls the action of the pre-proofing cabinet. In this way the device according to the invention operates synchronous with the pre-proofing cabinet. In this case it is preferable if the device is provided with a means for detecting a piece of dough on the transition from the first to the second conveyor belt at the moment upon which the control signal is transmitted. If, at that moment, there is a piece of dough on the transition, then the device according to the invention is not activated.

The device according to the invention further contains a first, a second and a third driving means for independently driving a driving roll of the first conveyor belt 5, a driving roll of the second conveyor belt and the trolley 24, respectively.

The action of the device according to the invention is as follows.

Pieces of dough 8 are continuously conveyed at a conveying velocity by the first conveyor belt 5 to the second conveyor belt 6, while the trolley 24 is in the initial position. When the detecting means detects that the number of pieces of dough 7 transferred to the second conveyor belt 6 is equal to the determined number of pieces of dough, for instance equal to the number of holders in the dough tray used, such as 6, 8 or 12, or when activated by the pre-proofing cabinet, a control signal is transmitted to the second driving means and to the third driving means.

In response to the control signal the second driving means increases the conveying velocity of the second conveyor belt 6 with an additional velocity. At the same time the third driving means start one reciprocal motion of the trolley 24, so that the trolley 24 moves from the initial position to the farthest position. Consequently, the distances between the piece of dough which is nearest the incoming end 27 of the second conveyor belt 6 and that which is nearest the outgoing end 26 of the first conveyor belt 5 is enlarged. Because the trolley 24 moves to its farthest position, it is ensured that none of the pieces of dough 8 that are on the first conveyor belt 5 are transferred to the second conveyor belt.

As a consequence these pieces of dough 8 continue to be conveyed at conveying velocity of the first conveyor belt 5. It is noted that the movement of the trolley 24 does not influence the conveying velocity of the conveyor belts.

When, on account of the additional velocity of the second conveyor belt 6, the distance between the pieces of dough 7 on the second conveyor belt 6 and the pieces of dough 8 on the first conveyor belt 5 is sufficient to guarantee the reproducible and correct pushing-off of the pieces of dough 7 from the second conveyor belt, the conveying velocity of the second conveyor belt 6 is reduced to nil or almost nil and the pieces of dough 7 are pushed from the second conveyor belt 6 into the holders of a dough tray. The movements are geared to one another, such that pushing off the pieces of dough takes place approximately when the trolley 24 is in its farthest position. After the pieces of dough have been pushed off the second conveyor belt, the second conveyor belt is accelerated again to the original conveying velocity.

Whilst the trolley 24 is moved back to the initial position, the second conveyor belt 6 is pushed, as it were, under the pieces of dough 8 and an accelerated transfer of pieces of dough from the first to the second conveyor belt takes place. When the trolley 24 reaches its initial position again, the following cycle is started in response to the following control signal.

Because the conveyor belts are driven continuously and the trolley provides sufficient separation between the pieces of dough and sufficient time for a correct pushing-off of pieces of dough, on the one hand, and because, on the other hand, an accelerated transfer of pieces of dough from the first to the second conveyor belt is realized, the capacity of the device is considerably upgraded and 8000 pieces of dough or more can be processed per hour.

Depending on the size of the pieces of dough, the mutual distance between the pieces of dough, the number of holders of a dough tray, the desired capacity and the like, the conveying velocity, the additional velocity and the velocity of the reciprocal motion can be adjusted, it being preferable for greater accuracy that the second and/or third driving means is executed as a servomotor.

What is claimed is:

1. Device for feeding pieces of dough to dough trays of a pre-proofing cabinet, which device is provided with:

a first conveyor belt for continuously conveying pieces of dough in a conveying direction and at a conveying velocity, which first conveyor belt has a dough bearing surface, and an opposing driving surface, an incoming end and an outgoing end, which first conveyor belt contains at least four driving rolls, in which a first of the driving rolls defines the incoming end and a second of the driving rolls defines the outgoing end, the first and the second driving roll contacting the driving surface of the first conveyor belt and lying in one plane, in which a third of the driving rolls lies under the plane and between the first and second driving rolls and contacts the dough bearing surface of the first conveyor belt, in which a fourth of the driving rolls lies beneath the third driving roll and contacts the driving surface of the first conveyor belt, the third driving roll being located between the first and the fourth driving roll, a first driving means for driving at least one of the driving rolls of the first conveyor belt, a second conveyor belt for continuously conveying pieces of dough in a conveying direction and at a conveying velocity, which second conveyor belt is placed on the extension of the first conveyor belt, which second conveyor belt has a dough bearing surface and an opposing driving surface, an incoming end and an outgoing end, which second conveying belt contains at least four driving rolls, in which a first of the driving rolls defines the incoming end and a second of the driving rolls defines the outgoing end, the first and the second driving roll contacting the driving surface of the second conveyor belt and are in one plane, in which a third of the driving rolls lies under the plane and between the first and second driving rolls and contacts the dough bearing surface of the second conveyor belt, in which a fourth of the driving rolls lies beneath the third driving roll and contacts the driving surface of the second conveyor belt, the third driving roll being located between the second and the fourth driving roll, in which the incoming end of the second conveying belt connects to the outgoing end of the first conveyor belt, a second driving means for driving at least one of the driving rolls of the second conveyor belt independant of the drive of the first conveyor belt, a trolley moving reciprocally in conveying direction from a starting position to a farthest position, on which trolley the second and the third driving roll of the first conveyor belt and the first and third driving roll of the second conveyor belt are mounted, a third driving means for driving the trolley independant of the drive of the conveyor belts, the second driving means being a driving means for increasing the conveyor velocity of the second conveyor belt by an additional velocity in response to a control signal, subsequently decelerating it to a standstill or almost to a standstill and then accelerating to the conveying velocity, and the third driving means being a driving means for starting one reciprocating motion of the trolley in response to the control signal.

2. Device according to claim 1, wherein the second and third driving means contain a servo-motor.

3. Device according to claim 1, wherein the control signal is generated by a detection means for detecting a determined number of dough pieces on the second conveyor belt, the detection means containing a means for issuing a control signal to the second and third driving means in reaction to the detection of the determined number of dough pieces on the second conveyor belt.

4. Device according to claim 3, wherein the detection means is attached to the trolley.

5. Device according to claim 1, wherein the control signal is generated by the pre-proofing cabinet.

\* \* \* \* \*